US008806337B2

(12) United States Patent
Scherpa et al.

(10) Patent No.: US 8,806,337 B2
(45) Date of Patent: Aug. 12, 2014

(54) SYSTEM AND METHOD FOR REPRESENTATION OF AVATARS VIA PERSONAL AND GROUP PERCEPTION, AND CONDITIONAL MANIFESTATION OF ATTRIBUTES

(75) Inventors: Josef Scherpa, Fort Collins, CO (US); John Morgan Lance, Littleton, MA (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 12/431,209

(22) Filed: Apr. 28, 2009

(65) Prior Publication Data

US 2010/0275141 A1 Oct. 28, 2010

(51) Int. Cl.
*G06F 3/048* (2013.01)

(52) U.S. Cl.
USPC .......................................... 715/706; 715/765

(58) Field of Classification Search
USPC ................................................ 715/706, 765
See application file for complete search history.

(56) References Cited

U.S. PATENT DOCUMENTS

2004/0250210 A1 12/2004 Huang et al.
2006/0089543 A1 4/2006 Kim et al.
2007/0113181 A1 5/2007 Blattner et al.
2007/0167204 A1* 7/2007 Lyle et al. .......................... 463/9
2007/0168863 A1* 7/2007 Blattner et al. ............... 715/706
2007/0218987 A1 9/2007 Van Luchene et al.
2007/0260984 A1* 11/2007 Marks et al. .................. 715/706
2008/0020361 A1* 1/2008 Kron et al. .................... 434/262
2008/0021958 A1* 1/2008 Foote ............................ 709/204
2009/0309891 A1* 12/2009 Karkanias et al. ............ 345/581

OTHER PUBLICATIONS http://ocw.mit.edu/NR/rdonlyres/Media-Arts-and-Sciences/MAS-961Designing-Sociable-MediaSpring2001/CD428AC2-3F6E-4F7F-86F8-527AF6076E16/0/danah08.pdf, downloaded on Oct. 20, 2011, pp. 1-2.

* cited by examiner

*Primary Examiner* — Matt Kim
*Assistant Examiner* — William Trapanese
(74) *Attorney, Agent, or Firm* — Holland & Knight LLP; Brian J. Colandreo, Esq.; Jeffrey T. Placker, Esq.

(57) ABSTRACT

An avatar having one or more features is defined, wherein the one or more features correspond to one or more attributes of a user. One or more user inputs associated with the one or more attributes of the user are received. The one or more features of the avatar are modified based, at least in part, upon the one or more user inputs associated with the one or more attributes of the user. The avatar is displayed, wherein the displayed avatar reflects the modifications to the one or more modified features of the avatar.

18 Claims, 8 Drawing Sheets

SYSTEM AND METHOD FOR REPRESENTATION OF AVATARS VIA PERSONAL AND GROUP PERCEPTION, AND CONDITIONAL MANIFESTATION OF ATTRIBUTES

TECHNICAL FIELD

This disclosure relates to avatars and, more particularly, to a method of representing avatars based upon the perception of one or more users.

BACKGROUND

Conventional systems for generating avatars generally allow users to digitally represent themselves via configuration of one or more features of an avatar. Users may typically select and configure the features based on their own interests and/or preferences. Other users' opinions of this digital representation may vary from one of e.g., agreement/accuracy, disagreement/inaccuracy, or simple inadequacy. Often, this may be due to a real-world or virtual-world familiarity with the user by others. It may often be useful for other users to provide input regarding the various attributes of the user, which may then manifest changes to the features of that user's avatar.

SUMMARY OF DISCLOSURE

In a first implementation, a computer program product includes a computer readable medium having a plurality of instructions stored on it. When executed by a processor, the instructions cause the processor to perform operations including defining one or more features of an avatar, wherein the one or more features correspond to one or more attributes of a user. One or more user inputs associated with the one or more attributes of the user are received. The one or more features are modified based, at least in part, upon the one or more user inputs associated with the one or more attributes of the user. The avatar is displayed, wherein the displayed avatar reflects the modifications to the one or more modified features of the avatar.

One or more of the following features may be included. One or more user ratings associated with the one or more user inputs may be received. The one or more user inputs may be received from a first set of users and the one or more user ratings may be received from a second set of users. A degree of modification may be determined to apply to the one or more features based, at least in part, upon the one or more user ratings associated with the one or more user inputs. The one or more features may be modified based, at least in part, upon the determined degree of modification.

At least a first set of the one or more user inputs may be received from a first set of users. At least a second set of the one or more user inputs may be received from a second set of users. A first avatar may be generated based, at least in part, upon the first set of the one or more user inputs. A second avatar may be generated based, at least in part, upon the second set of the one or more user inputs. One or more of the first avatar may be displayed to the first set of users and the second avatar may be displayed to the second set of users.

According to another implementation, a computing system includes a processor and a memory module coupled with the processor. A first software module is executable by the processor and the memory module. The first software module is configured to define one or more attributes of an avatar, wherein the one or more features correspond to one or more attributes of a user. A second software module is executable by the processor and the memory module. The second software module is configured to receive one or more user inputs associated with the one or more attributes of the user. A third software module is executable by the processor and the memory module. The third software module is configured to modify the one or more features of the avatar based, at least in part, upon the one or more user inputs associated with the one or more attributes of the user. A fourth software module is executable by the processor and the memory module. The fourth software module is configured to display the avatar, wherein the displayed avatar reflects the modifications to the one or more modified features of the avatar.

One or more of the following features may be included. A fifth software module is executable by the processor and the memory module. The fifth software module may be configured to receive one or more user ratings associated with the one or more user inputs. The one or more user inputs may be received from a first set of users and the one or more user ratings may be received from a second set of users. A degree of modification to apply to the one or more features may be determined based, at least in part, upon the one or more user ratings associated with the one or more user inputs. The one or more features may be modified based, at least in part, upon the determined degree of modification.

At least a first set of the one or more user inputs may be received from a first set of users. At least a second set of the one or more user inputs may be received from a second set of users. A first avatar may be generated based, at least in part, upon the first set of the one or more user inputs. A second avatar may be generated based, at least in part, upon the second set of the one or more user inputs. One or more of the first avatar may be displayed to the first set of users and the second avatar may be displayed to the second set of users.

According to yet another implementation, a computer implemented method includes defining one or more features of an avatar, wherein the one or more features correspond to one or more attributes of a user. One or more user inputs associated with the one or more attributes of the user are received. The one or more features are modified based, at least in part, upon the one or more user inputs associated with the one or more attributes of the user. The avatar is displayed, wherein the displayed avatar reflects the modifications to the one or more modified features of the avatar.

One or more of the following features may be included. One or more user ratings associated with the one or more user inputs may be received. The one or more user inputs may be received from a first set of users and the one or more user ratings may be received from a second set of users. A degree of modification to apply to the one or more features may be determined based, at least in part, upon the one or more user ratings associated with the one or more user inputs. The one or more features may be modified based, at least in part, upon the determined degree of modification.

At least a first set of the one or more user inputs may be received from a first set of users. At least a second set of the one or more user inputs may be received from a second set of users. A first avatar may be generated based, at least in part, upon the first set of the one or more user inputs. A second avatar may be generated based, at least in part, upon the second set of the one or more user inputs. One or more of the first avatar may be displayed to the first set of users and the second avatar may be displayed to the second set of users.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
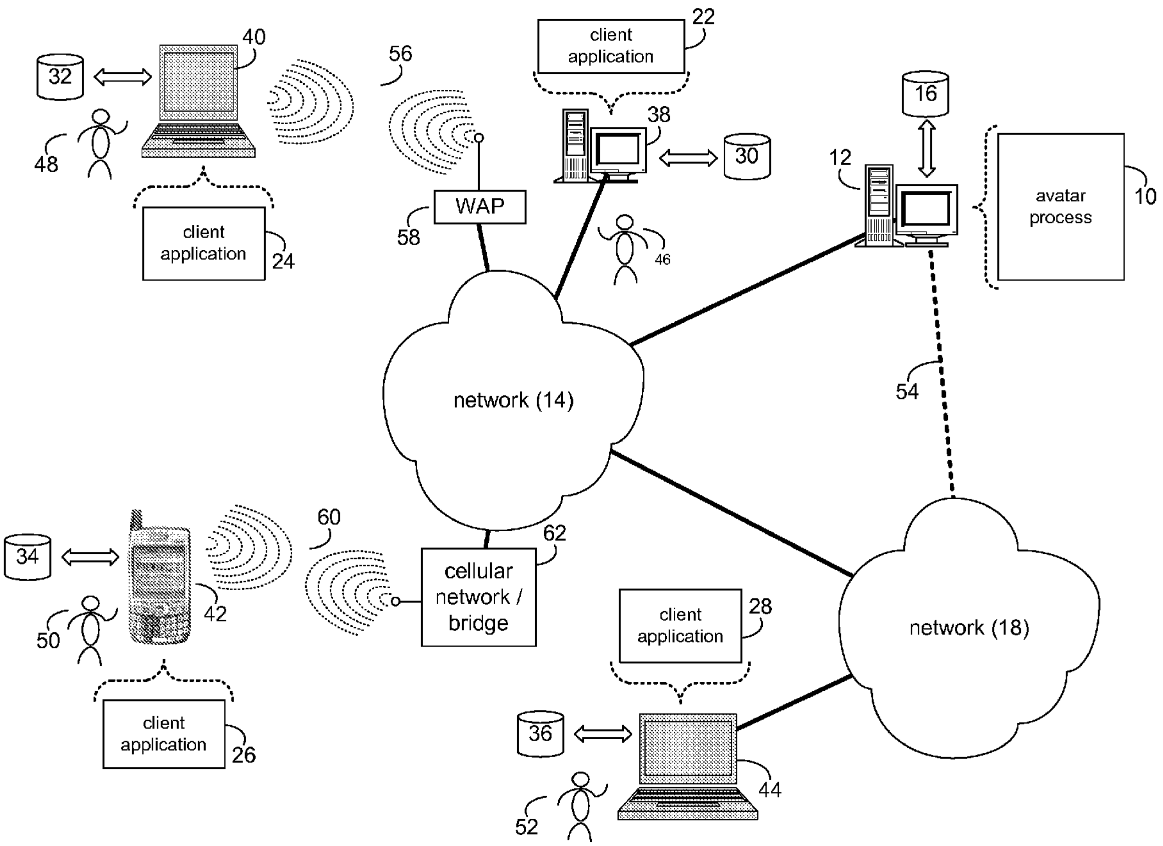
FIG. 1 diagrammatically depicts an avatar process coupled to a distributed computing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown avatar process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

In addition/as an alternative to being a server-based application residing on server computer 12, avatar process 10 may be a client-side application residing on one or more client electronic devices 38, 40, 42, 44 (e.g., stored on storage devices 30, 32, 34, 36, respectively). As a client-side application, avatar process 10 may, e.g., be a stand alone application, interface with a server/internet-based virtual world (e.g., Second Life®, a registered trademark of Linden Research, Inc. in the United States), or may be an applet/application that is executed within a related application. Accordingly, avatar process 10 may be a server-based process, a client-side process and/or may be a hybrid client-side/server-based process, which may be executed, in whole or in part, by a client application and by a server application.

The instruction sets and subroutines of avatar process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Additionally/alternatively, avatar process 10 (via, e.g., server computer 12) may interface with one or more data systems/databases. For example, avatar process 10 may receive user input by interfacing with a human resources database, a news database, or any other data systems/databases that may retain information relevant to attributes of an avatar.

The instruction sets and subroutines of client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may, for example, perform a search via a portal having selectable and/or configurable portlets, which may provide results relevant to the portlets.

Users 46, 48, 50, 52 may access avatar process 10 directly through the device on which the client application (e.g., client applications 22, 24, 26, 28) is executed, namely client electronic devices 38, 40, 42, 44, for example. Users 46, 48, 50, 52 may also access user input process 20 directly through network 14 or through secondary network 18. Further, server computer 12 (i.e., the computer that executes user input process 20 and/or avatar process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

For the purpose of the following description, client application 22 may be discussed. However, this is for illustrative purposes only and should not be construed as a limitation of the present disclosure, as other client applications (e.g., client applications 24, 26, 28) may be equally utilized.

Figure 2:
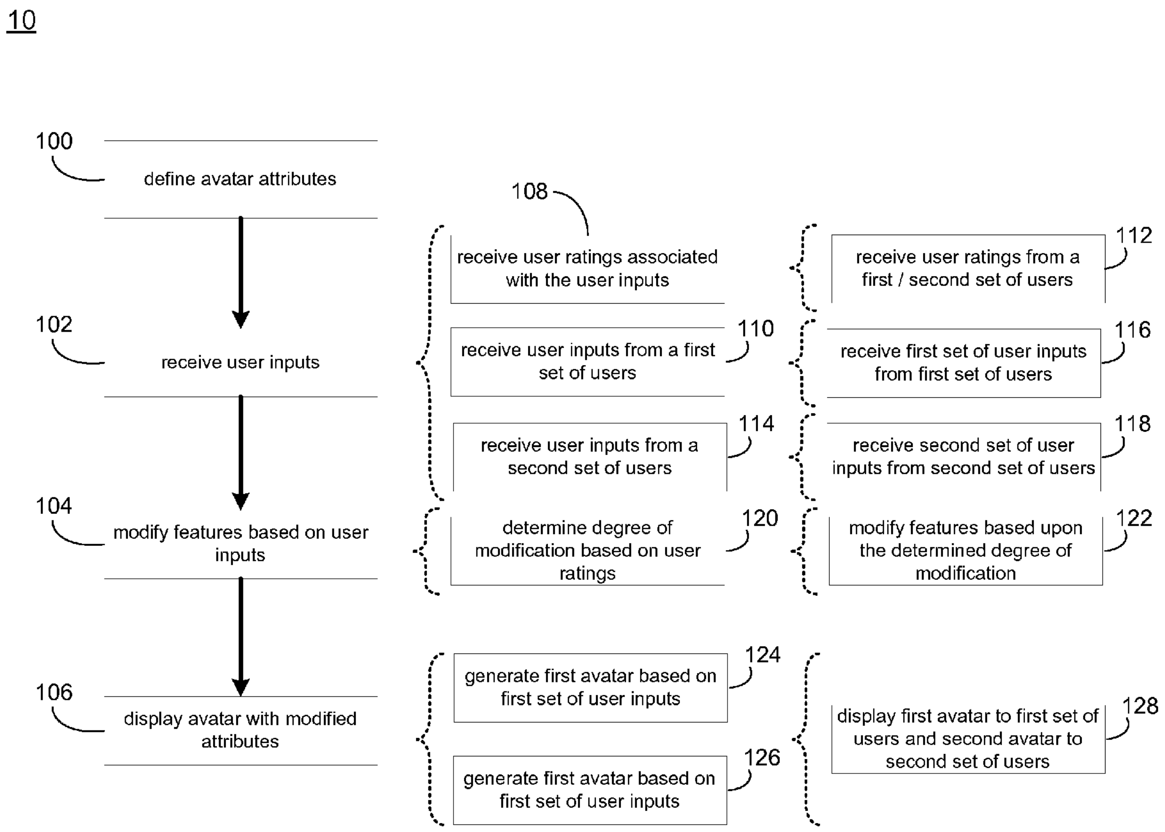
FIG. 2 is a flow chart of a process performed by the avatar process of FIG. 1.

Referring also to FIG. 2, avatar process 10 generally may define 100 one or more features of an avatar, wherein the one or more features may correspond to one or more attributes of a user. Avatar process 10 may also receive 102 one or more user inputs associated with the one or more attributes of the user. Avatar process 10 may further modify 104 the one or more features of the avatar based, at least in part, upon the one or more user inputs associated with the one or more attributes of the user. Additionally, avatar process 10 may display 106 the avatar, wherein the displayed avatar may reflect the modifications to the one or more modified features of the avatar.

Figure 3:
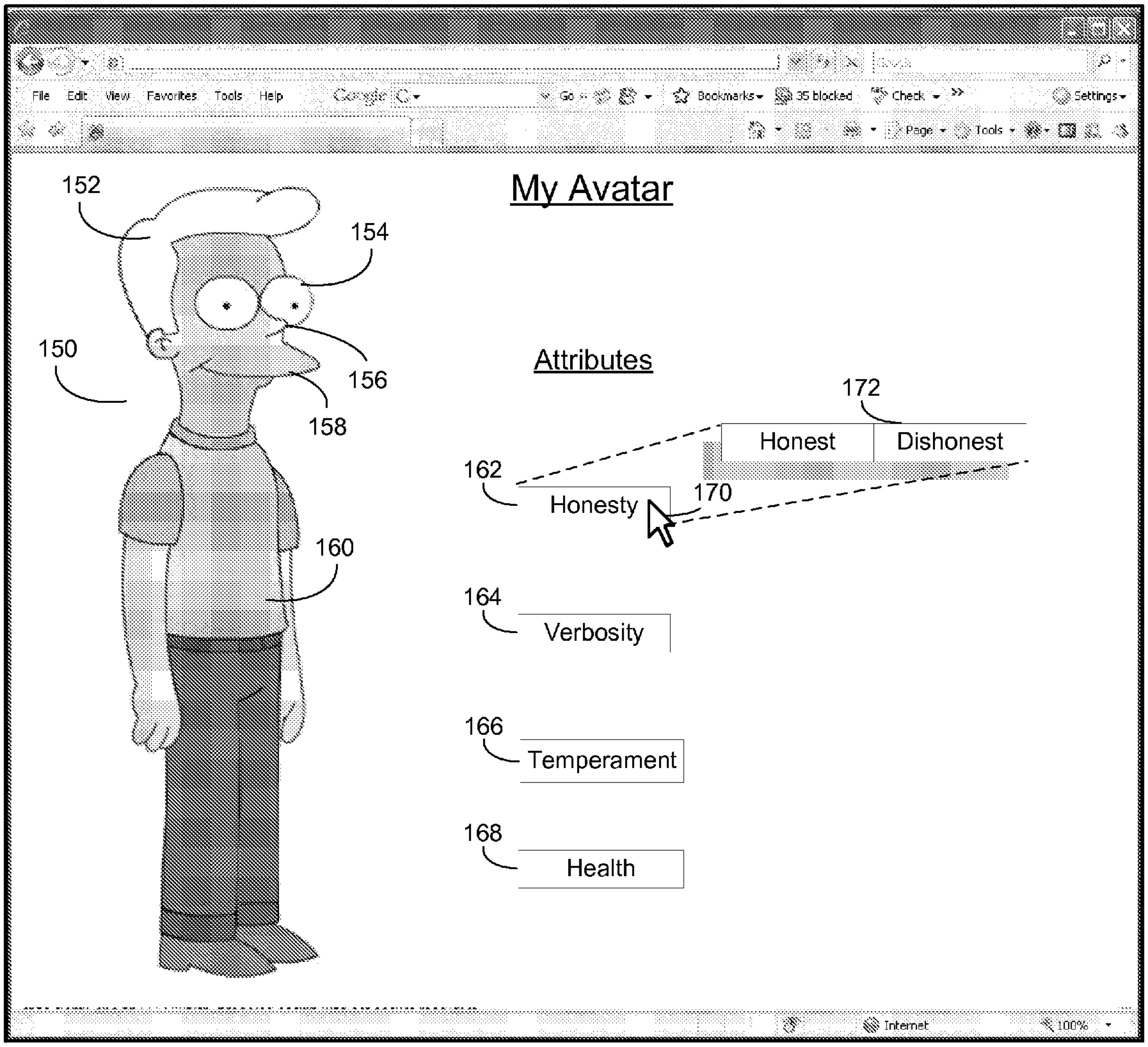
FIG. 3 diagrammatically depicts a user interface that may be rendered by a client application of FIG. 1.

Referring also to FIG. 3, avatar process 10 may define 100 one or more features of an avatar (e.g., avatar 150), which may correspond to one or more attributes of a user. As is known, an avatar may represent a computer user's (e.g., users 46, 48, 50, 52) virtual representation of himself/herself or alter ego (e.g., online identity). Avatars may be in the form of a three-dimensional model (e.g., as used in computer games), a two-dimensional icon (e.g., as used on Internet forums and other communities), or a text construct (e.g., as found on early systems such as a Multi-User Dungeon). In addition/as an alternative to representing a user's online identity via an avatar, image or textual descriptions may also function to represent a user's online identity.

Attributes may generally correspond to various features of an avatar (e.g., avatar 150) that a user(s) may modify to achieve the desired representation of himself/herself or alter ego. For example, avatar 150 may include various features including, but not limited to: hair feature 152, eye feature 154, nose feature 156, mouth feature 158, and waist feature 160. Exemplary attributes of a user may include, but are not limited to: honesty, verbosity, temperament, and health. Additionally, avatar process 10 may generate on-screen buttons that may correlate to the attributes of a user. For example, avatar process 10 may generate honesty attribute button 162, verbosity attribute button 164, temperament attribute button 166, and health attribute button 168 (which may correspond to the attributes of honesty, verbosity, temperament, and health, respectively). Accordingly, avatar process 10 may define 100 various features of a user's (e.g., user 46) avatar, which may correspond to one or more attributes of that user.

For example, user 46's perception of itself may resemble that which is depicted by avatar 150. As such, user 46 may believe itself to be honest, a good listener, mild tempered, and generally in good health. Accordingly, avatar process 10 may define 100 the features of user 46's avatar (e.g., avatar 150) to correspond to those attributes. In such a case, nose feature 156 may depict an average-sized nose (e.g., corresponding to user 46's attribute of honesty), mouth feature 158 may depict a closed mouth (e.g., corresponding to user 46's attribute of being a good listener and/or user 46's attribute of being mild tempered), and waist feature 160 may depict an average-sized waist (e.g., corresponding to user 46's attribute of being in good health).

Additionally, and as demonstrated in the above example, while one feature may correspond to one attribute (and vice-versa), this is not to be construed as a limitation of the present disclosure. One of skill in the art will appreciate that any number of attributes may correspond to any number of features, and any number of features may correspond to any number of attributes (e.g., the status of avatar 150's mouth feature 158 may correspond to user 46's attribute of verbosity and/or temperament).

For clarity of explanation, hair feature 152, eye feature 154, nose feature 156, mouth feature 158, and waist feature 160 are discussed supra as exemplary features of a user's avatar. Similarly, the attributes of honesty, verbosity, temperament, and health are discussed supra as exemplary attributes of a user. One of skill in the art will appreciate that any number of other features or attributes may be utilized within the context of the subject application.

Additionally, avatar process 10 may receive 102 one or more user inputs associated with the one or more attributes (e.g., honesty, verbosity, temperament, and health) of a user (e.g., user 46). User inputs may generally pertain to other users' perception (e.g., users 48, 50, 52) of how accurately a particular user's (e.g., user 46) avatar (e.g., avatar 150) represents that user. For example, it may be assumed that user 46 is a politician for the state of South Carolina that has created an avatar (e.g., avatar 150) representing user 46's perception of itself. Further, it may be assumed that user 48 is a constituent of user 46 (e.g., a citizen of South Carolina) that believes user 46 to be a dishonest politician, and may therefore wish to provide user input about such belief. Accordingly, user 48 may utilize on-screen pointer 170 to select honesty attribute button 162, which may result in honest/dishonest box 172 being generated.

While user inputs are described herein as being provided by, e.g., a user selecting an on-screen button (e.g., honesty attribute button 162) associated with a particular attribute of a user, this is not to be construed as a limitation of this disclosure, as user inputs may be provided in any number of other means known to one of skill in the art. For example, rather than selecting honesty attribute button 162 to provide a user input, user 48 may have recorded user input data (corresponding to user 46's attribute of honesty) in a separately-maintained file, which may, e.g., be received 102 by avatar process 10. Additionally/alternatively, and as mentioned above, avatar process 10 may interface with one or more data systems/databases. For example, avatar process 10 may receive 102 user input by interfacing with a human resources database, a news database, or any other data systems/databases that may retain information relevant to attributes of an avatar.

Figure 4:
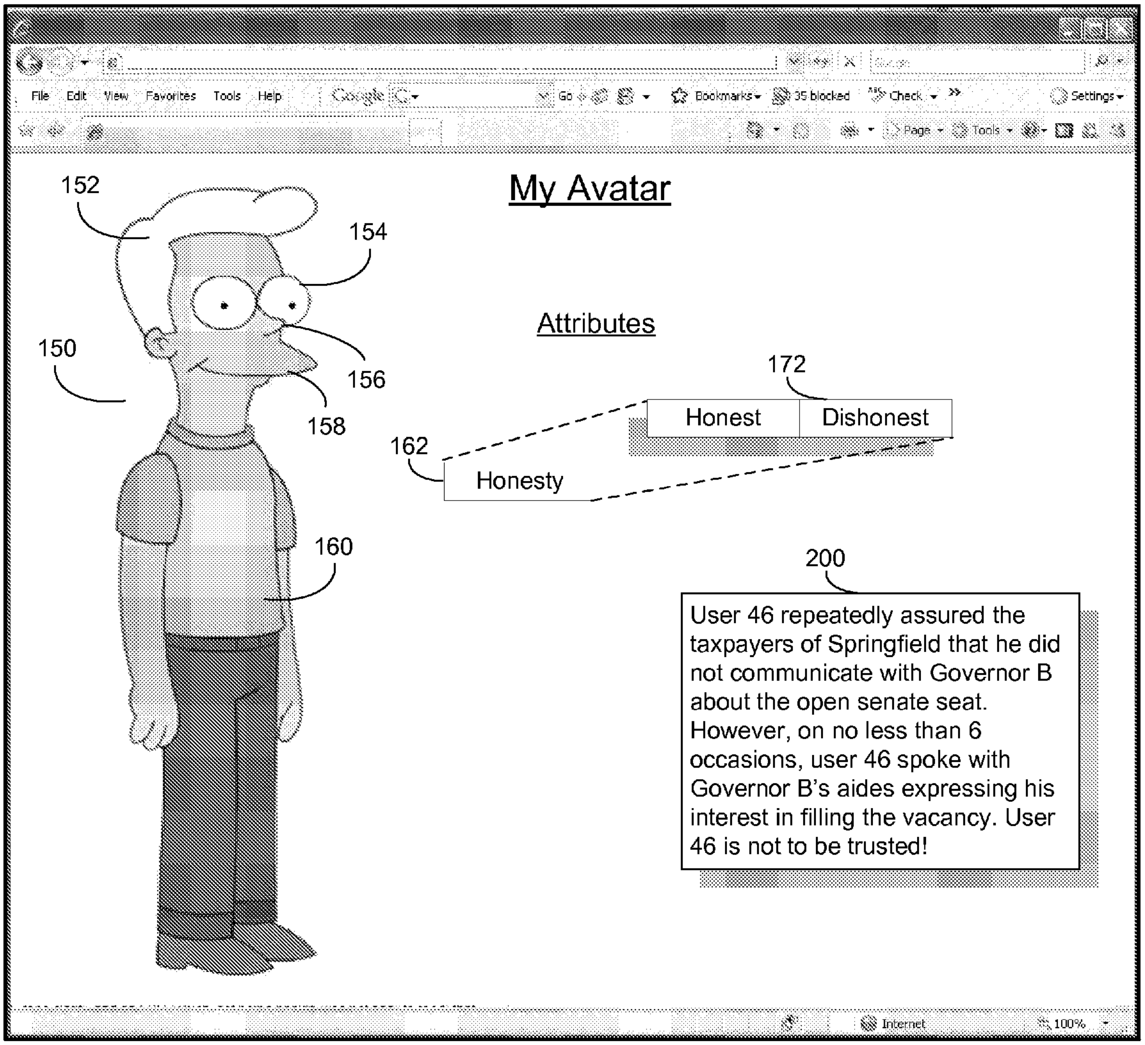
FIG. 4 diagrammatically depicts a user interface that may be rendered by a client application of FIG. 1.

Referring also to FIG. 4, and after selecting, e.g., "dishonest" within honest/dishonest box 172, honesty comment box 200 may be generated. As will be described in greater detail below, after user 48 utilizes honesty comment box 200 to provide feedback relevant to user 46's attribute of honesty, avatar process 10 may modify 104 the one or more features (e.g., nose feature 156) of the avatar based, at least in part, upon the one or more user inputs associated with the one or more attributes (e.g., honesty) of the user (e.g., user 46).

While avatar process 10 has been described as receiving 102 one or more user inputs associated with attributes of, e.g., user 46 from a separate user (e.g., users 48, 50, 52), this is not intended to be a limitation of this disclosure, as avatar process 10 may receive 102 user inputs from the user-at-issue (e.g., user 46). For example, as opposed to user 48 providing user input regarding user 46's avatar, user 46 may provide user input regarding its own avatar.

Figure 5:
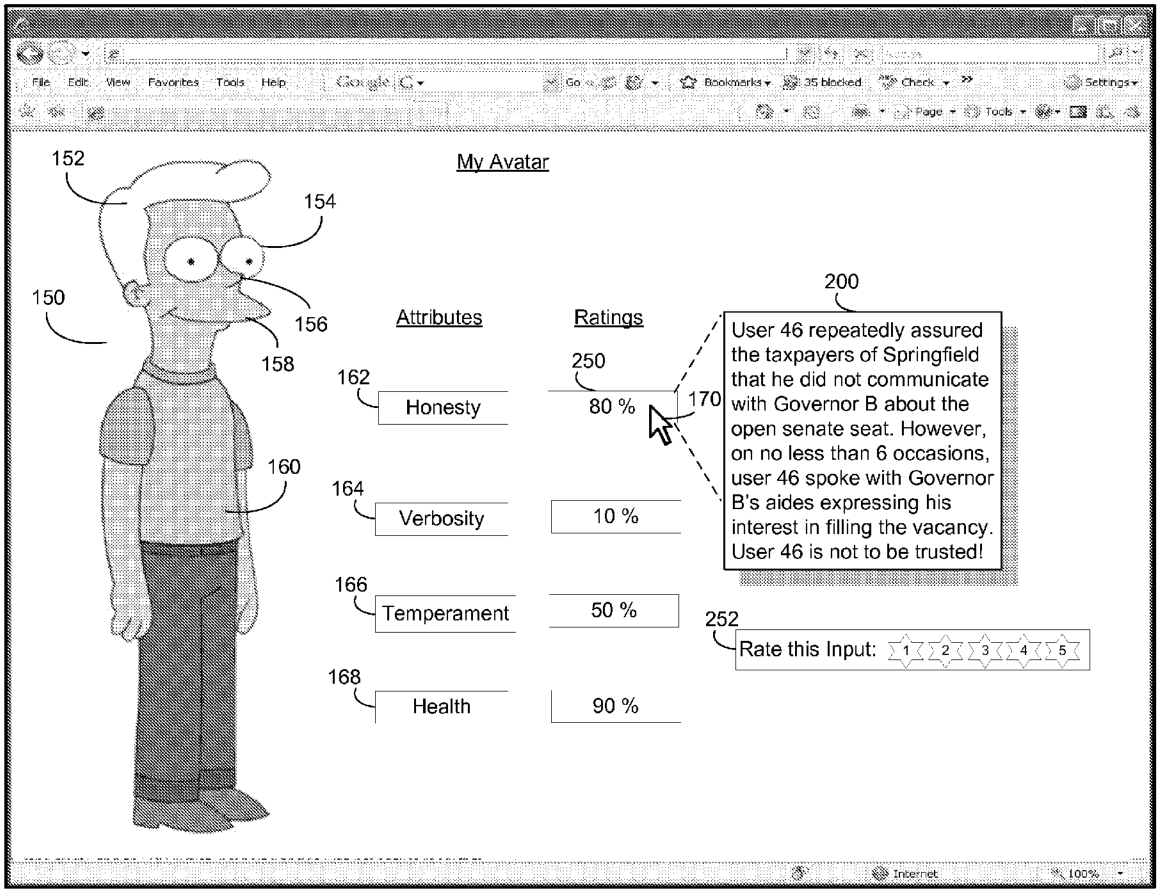
FIG. 5 diagrammatically depicts a user interface that may be rendered by a client application of FIG. 1.

Additionally/alternatively, and prior to such modification 104, avatar process 10 may receive 108 one or more user ratings associated with the one or more user inputs. For example, and referring also to FIG. 5, after user 48's utilization of honesty comment box 200 to provide feedback relevant to user 46's attribute of honesty, avatar process 10 may display honesty rating box 250, which may indicate one or more user's general perception of that attribute. Thus, for example, if user 50 desired to rate user 48's input concerning user 46's attribute of honesty, user 50 may utilize on-screen pointer 170 to select honesty rating box 250. Avatar process 10 may then display user 48's comments (e.g., via honesty comment box 200), as well as rating selector 252, to user 50 to enable user 50 to rate its agreement or disagreement with that user input.

For the purposes of this example, it may be assumed that user 50 agrees with user 48's input regarding user 46's attribute of honesty. As such, user 50 may utilize rating selector 252 to indicate that it agrees with user 48 (i.e., that user 46 is a dishonest politician), by, e.g., providing a rating of "5 stars". While ratings of user inputs may be described herein as being provided via rating selector 252, this is not intended to be a limitation of this disclosure, as many other forms of ratings are possible. For example, rating selector 252 may provide other rating systems including, but not limited to: Leikert scales; multiple choice; true/false; absolute rank; check all that apply; numeric allocation; dropdown boxes; list boxes; single-line text response; multi-line text response; and fill in the blank.

Additionally/alternatively, the one or more user inputs may be received 110 from a first set of users and the one or more user ratings may be received 112 from a second set of users. Continuing with the above-stated example, it may further be assumed that user 48 may belong to a first set of users (e.g., citizens of the state of South Carolina) and that user 50 may belong to a second set of users (e.g., citizens of the state of Massachusetts). Accordingly, avatar process 10 may receive 110 one or more user inputs from, e.g., user 48 (e.g., a user belonging to a first set of users), and may receive 112 one or more user ratings from, e.g., user 50 (e.g., a user belonging to a second set of users).

Illustratively, and continuing with the above-stated example, it may be desirable to only allow constituents of user 46 (e.g., the first set of users) to provide user input pertaining to user 46's attributes, as the user input of the first set of users may be more likely to be valid because those users reside in user 46's governed area (e.g., South Carolina). Further, while the second set of users (e.g., citizens of Massachusetts) may not be as intimately aware of user 46's attributes (e.g., due to geographic differences), it may be desirable to allow the second set of users to rate the user input provided by the first set of users (e.g., constituents of user 46). Accordingly, avatar process 10 may receive 112 user ratings from a second set of users, while only receiving 108 user inputs from a first set of users.

The reception 110 of user inputs from a first set of users is not to be construed as a limitation of this disclosure, however, as one of skill in the art will appreciate that avatar process 10 may receive 102 user inputs from any user or set of users. For example, and similar to the reception 110 of user inputs from the first set of users (e.g., citizens of South Carolina), avatar process 10 may receive 114 one or more user inputs from the second set of users (e.g., citizens of Massachusetts). Additionally, the reception 112 of user ratings from a second set of users is also not intended to be a limitation of this disclosure, as avatar process 10 may receive 112 user ratings from any user or set of users.

For example, avatar process 10 may receive 112 user ratings from the first set of users in addition to the user ratings received 114 from the second set of users. Further, avatar process 10 may weigh the user ratings from the first set of users and the second set of users. Continuing with the above-stated example, due to the first set of users being constituents of user 46, avatar process 10 may apply more weight to the user ratings received 112 from the first set of users than the user ratings received 114 from the second set of users.

Additionally/alternatively, avatar process 10 may receive 116 at least a first set of the one or more user inputs from a first set of users and may receive 118 at least a second set of the one or more user inputs from a second set of users. As will be discussed in greater detail below, avatar process 10 may display 106 different versions of a user's avatar to different sets of users. Accordingly, a first version of a user's avatar may be, e.g., based upon a first set of user inputs from a first set of users, and a second version of a user's avatar may be, e.g., based upon a second set of user inputs from a second set of users.

Figure 6:
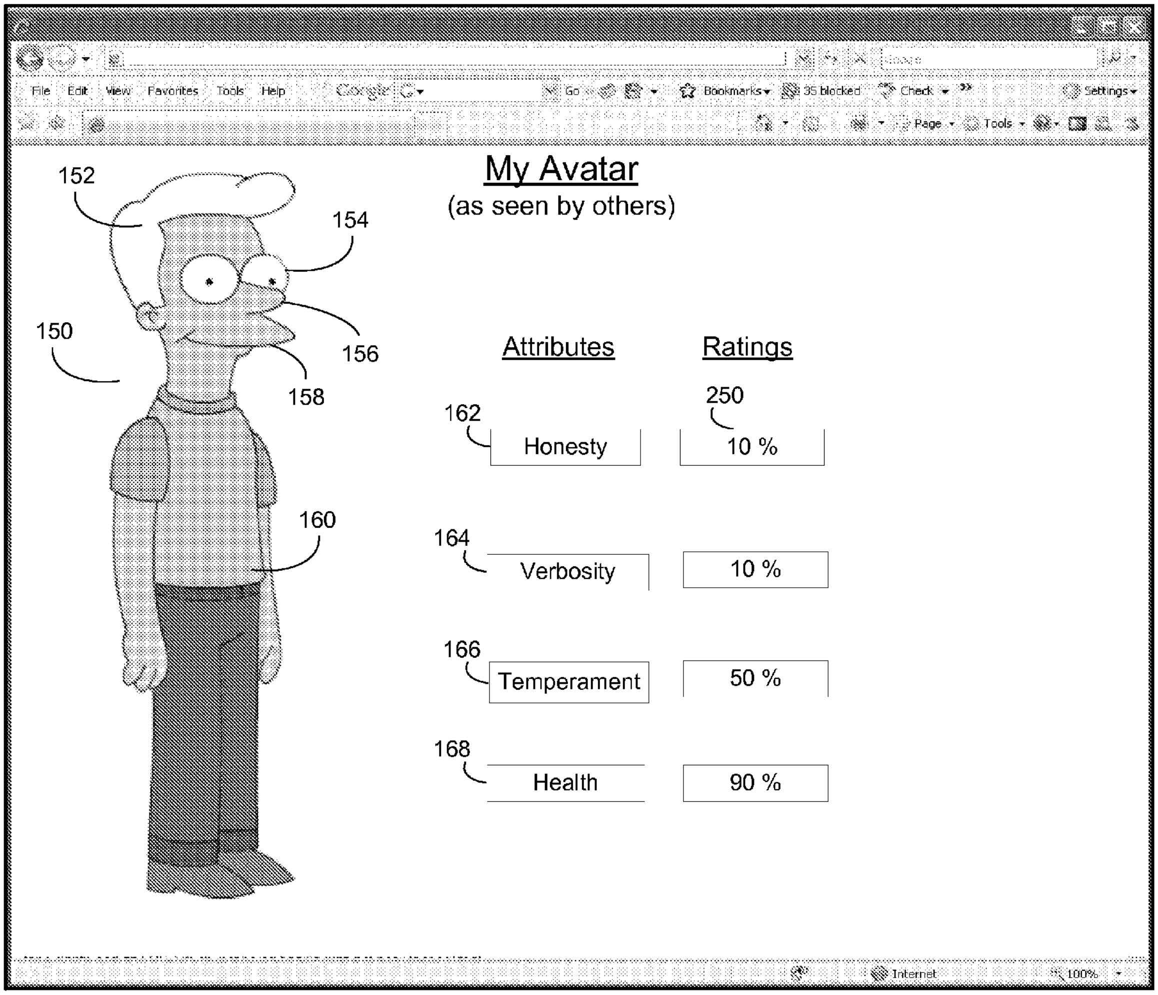
FIG. 6 diagrammatically depicts a user interface that may be rendered by a client application of FIG. 1.

Further, avatar process 10 may modify 104 one or more features of an avatar based, at least in part, upon one or more user inputs associated with one or more attributes of a user. As described above, avatar process 10 may receive 102 user inputs from any user or set of users. Continuing with the above-stated example wherein user 48 may believe user 46 to be a dishonest politician, avatar process 10 may have received 110 user input (e.g., via honest/dishonest box 172) from user 48 (e.g., from the first set of users) indicating that user 46's attribute of honesty may be misrepresented. Accordingly, and referring also to FIG. 6, avatar process 10 may modify 104 nose feature 156 of user 46's avatar (e.g., avatar 150) to reflect the dishonest nature of user 46's honesty attribute (e.g., by lengthening the nose of avatar 150).

The modification 104 of features of an avatar in response to a single user's input is not intended to be a limitation of this disclosure, however. One of skill in the art will appreciate that avatar process 10 may modify 104 features of an avatar in response to the user input of any number of users and/or sets of users.

Additionally/alternatively, avatar process 10 may determine 120 a degree of modification to apply to the one or more features based, at least in part, upon the one or more user ratings associated with the one or more user inputs. As stated above, avatar process 10 may receive 108 user ratings associated with the user inputs. Further, and continuing with the above-stated example, it may be assumed that avatar process 10 received 112 user ratings from, e.g., ten users within the second set of users (e.g., citizens of Massachusetts) concerning user 48's input regarding user 46's attribute of honesty. It may also be assumed that all ten of the users in the second set of users strongly agreed with user 48's user input, and therefore all provided a user rating of, e.g., "5 stars". In such a case, avatar process 10 may determine 120 that the degree of modification to apply to, e.g., nose feature 156 may be 100 percent.

This exemplary determination 120 of the degree of modification to apply to features of an avatar is not to be construed as a limitation of this disclosure, however. One of skill in the art will understand that users may provide varying user ratings concerning a particular user attribute, and that avatar process 10 may accordingly determine 120 degrees of modification that may comport with such varying ratings.

Additionally, avatar process 10 may modify 122 one or more features of an avatar based, at least in part, upon the determined degree of modification. As discussed in the above-stated example, avatar process 10 may determine 120 a degree of modification to apply to features of an avatar based, at least in part, upon received 108/112 user ratings. Upon determining 120, e.g., that the degree of modification may be 100 percent, avatar process 10 may modify 122 nose feature 156 of avatar 150 to reflect, e.g., the longest nose possible. Similarly, if the determined 120 degree of modification were, e.g., less than 100 percent, avatar process 10 may modify 122 nose feature 156 to, e.g., a correspondingly lessened length.

Figure 7:
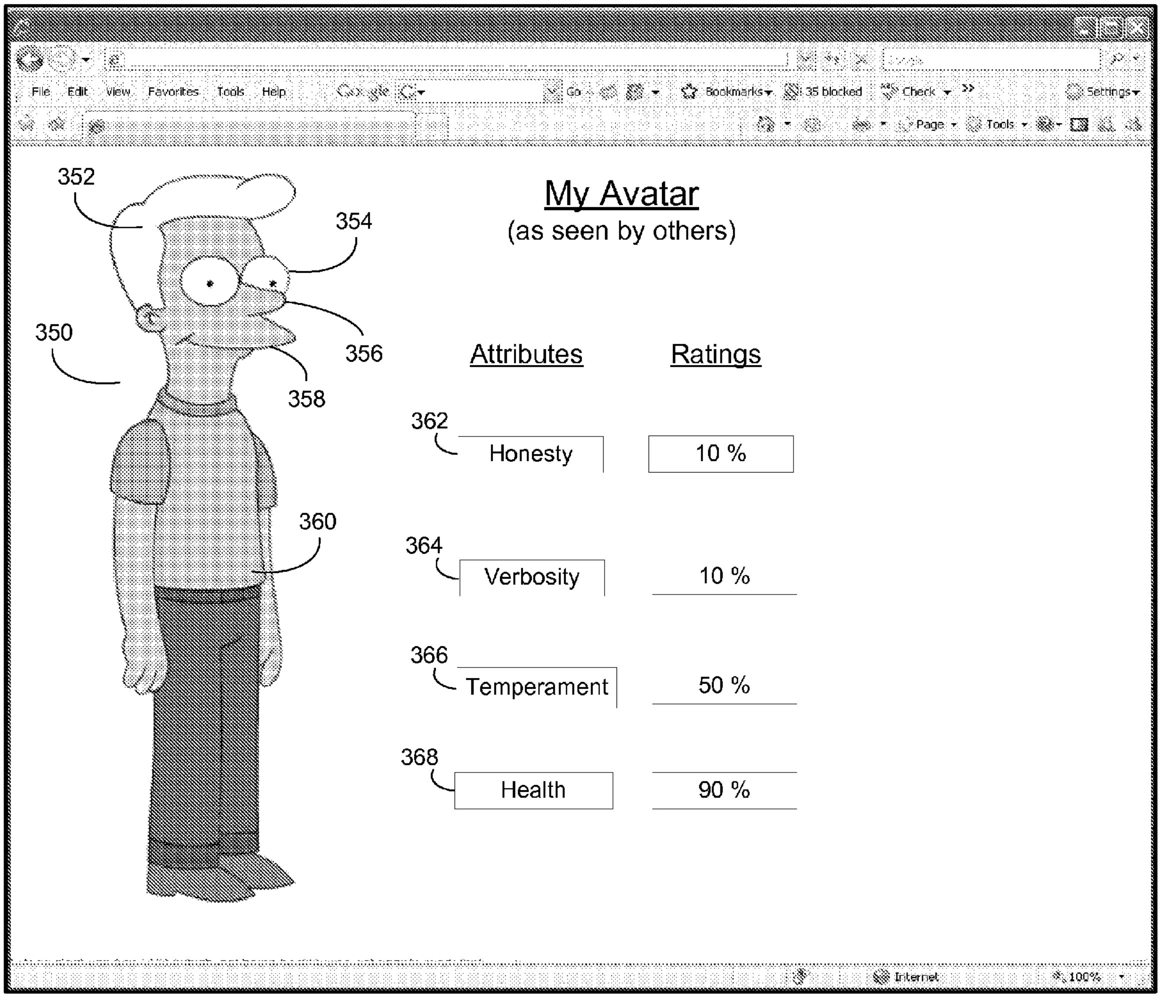
FIG. 7 diagrammatically depicts a user interface that may be rendered by a client application of FIG. 1.
Figure 8:
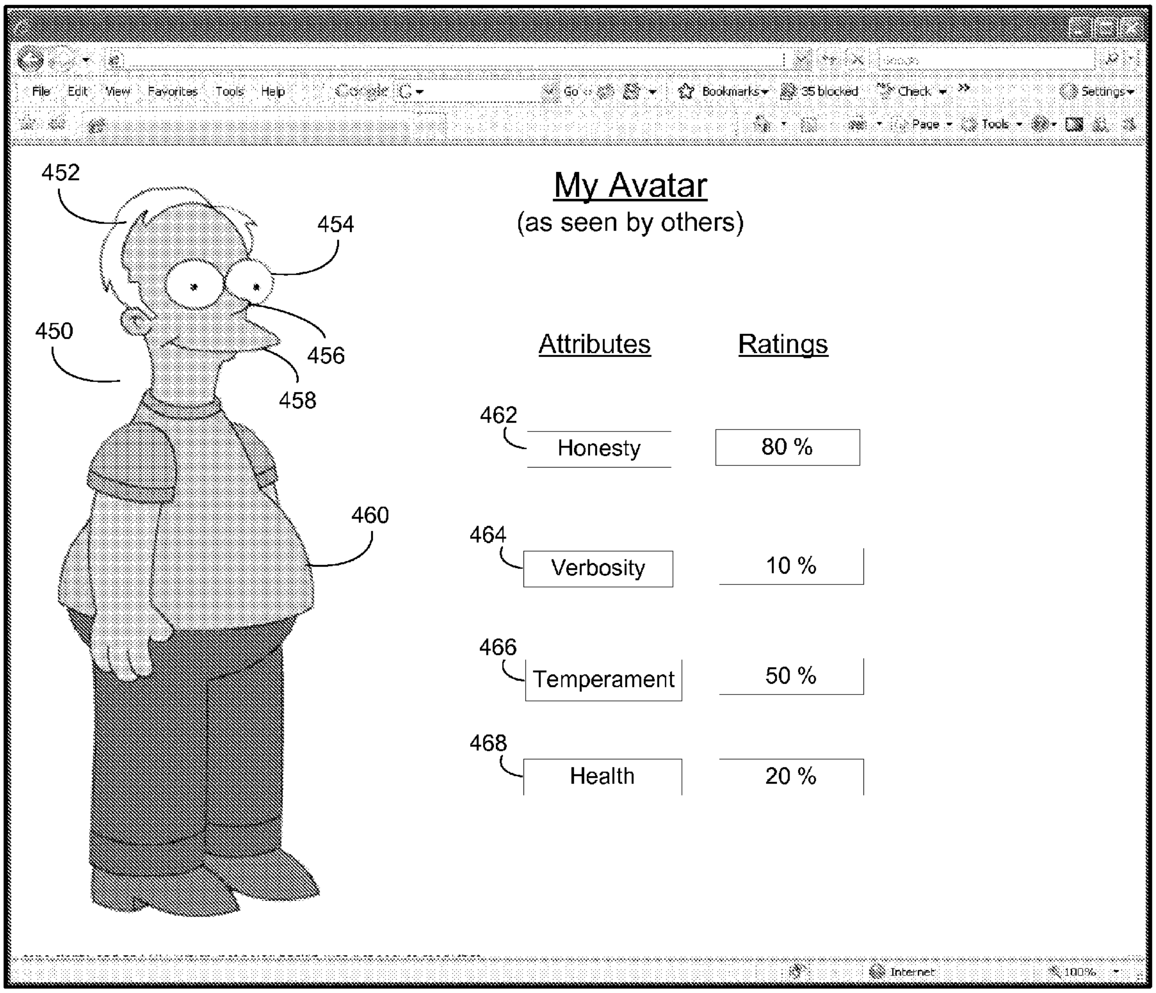
FIG. 8 diagrammatically depicts a user interface that may be rendered by a client application of FIG. 1.

Referring also to FIGS. 7 & 8, avatar process 10 may also generate 124 a first avatar (e.g., avatar 350) based, at least in part, upon the first set of the one or more user inputs, and may generate 126 a second avatar (e.g., avatar 450) based, at least in part, upon the second set of the one or more user inputs. As mentioned above, this may be desirable if avatar process 10 was being utilized to modify 104 an avatar based upon, e.g., the user inputs from only one set of users.

Illustratively, and continuing with the above-stated example, it may be assumed that avatar process 10 received 116 a first set of user inputs from a first set of users (e.g., citizens of South Carolina) and received 118 a second set of user inputs from a second set of users (e.g., citizens of Massachusetts), all of which pertaining to user 46's avatar (e.g., avatar 150). It may further be assumed that, due to differences in ideologies based on geographic location, the first set of users (including, e.g., user 48) may believe user 46 to be a dishonest politician, while the second set of users (including, e.g., user 50) may believe user 46 to be an honest politician. Additionally, and for the same reasons, the first set of users may believe user 46 to be in good health, while the second set of users may believe user 46 to be overweight.

Consequently, avatar process 10 may generate 124 a first modified avatar (e.g., avatar 350) based on the first set of user inputs (e.g., from the first set of users), and may generate 126 a second modified avatar (e.g., avatar 450) based on the second set of user inputs (e.g., from the second set of users). As described above, avatar process 10 may have modified 104 avatar 350 and avatar 450 based on sets of user input received

116/118 from the first set of users and the second set of users, respectively (e.g., via honesty attribute button 362/462, verbosity attribute button 364/464, temperament attribute button 366/466, and health attribute button 368/468).

For example, avatar process 10 may generate 124 avatar 350 with features (e.g., hair feature 352, eye feature 354, nose feature 356, mouth feature 358, and waist feature 360) that reflect user 46's attributes as perceived by South Carolinians (e.g., the first set of users). That is, avatar process 10 may modify 104 nose feature 356 to generate 124, e.g., a lengthened nose (e.g., corresponding to user 46's attribute of honesty), and waist feature 360 to generate 124 an average-sized waist (e.g., corresponding to user 46's attribute of health).

Further, avatar process 10 may generate 126 avatar 450 with features (e.g., hair feature 452, eye feature 454, nose feature 456, mouth feature 458, and waist feature 460) that reflect user 46's attributes as perceived by citizens of Massachusetts (e.g., the second set of users). For example, avatar process 10 may modify 104 nose feature 456 to generate 126, e.g., an average-sized nose (e.g., corresponding to user 46's attribute of honesty), waist feature 460 to generate 126, e.g., an extended waist (e.g., corresponding to user 46's attribute of health), and hair feature 452 to generate 126, e.g., a receding hairline (e.g., also corresponding to user 46's attribute of health).

Additionally, avatar process 10 may display 106 an avatar (e.g., avatar 350/450), wherein the displayed avatar may reflect the modifications to the one or more modified 104 features of the avatar. In addition to/an alternative to displaying 106 the avatars discussed supra via, e.g., a computer monitor, avatar process 10 may display 106 avatars via any means known to one of skill in the art. For example, such alternative means of display may include, but are not limited to: digital images (e.g., transmitted to a user via email), displaying 106 avatars on a television, and displaying 106 avatars on a mobile device.

Additionally/alternatively, avatar process 10 may display 128 one or more of a first avatar (e.g., avatar 350) to the first set of users and a second avatar (e.g., avatar 450) to the second set of users. One of skill in the art will appreciate that users of avatar process 10 may have a heightened level of interest regarding avatars that may have been modified 104 based on sets of user input relevant to those users. For example, user 48 (e.g., of the first set of users/South Carolinians) may only desire to view avatar 350, as user 48 may not have interest in how residents of Massachusetts (e.g., the second set of users) perceive user 46. Similarly, user 50 may only desire to view avatar 450, as user 50 may not have interest in how residents of South Carolina (e.g., the first set of users) perceive user 46. Accordingly, avatar process 10 may display 128 a first modified avatar (e.g., avatar 350) to the first set of users and a second modified avatar (e.g., avatar 450) to the second set of users.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product residing on a non-transitory computer readable medium having a plurality of instructions stored thereon which, when executed by a processor, cause the processor to perform operations comprising:

defining one or more physical features of an avatar related to a physical appearance of the avatar, wherein the one or more physical features related to the physical appearance of the avatar correspond to one or more personality attributes of a user;

receiving one or more user inputs associated with the one or more personality attributes of the user, including receiving a first set of the one or more user inputs from a first set of users and receiving a second set of the one or more user inputs from a second set of users, wherein receiving the first set of the one or more user inputs from the first set of users and receiving the second set of the one or more user inputs from the second set of users includes perceptions of the first set of users and second set of users of how accurately the avatar represents the user;

modifying the one or more physical features of the avatar based, at least in part, upon the one or more user inputs associated with the one or more personality attributes of the user;

displaying the avatar, wherein the displayed avatar reflects the modifications to the one or more modified physical features of the avatar; and automatically providing different versions of the avatar to different sets of users based, at least in part, upon the received one or more user inputs associated with the one or more personality attributes of the user, wherein a first version of the avatar is provided based upon, at least in part, the one or more user inputs received from the first set of users and a second version of the avatar is provided based upon, at least in part, the one or more user inputs received from the second set of users.

2. The computer program product of claim 1, further including instructions for receiving one or more user ratings associated with the one or more user inputs.

3. The computer program product of claim 2, wherein the instructions for modifying the one or more physical features of the avatar based, at least in part, upon the one or more user inputs further comprises:

determining a degree of modification to apply to the one or more physical features based, at least in part, upon the one or more user ratings associated with the one or more user inputs; and modifying the one or more physical features based, at least in part, upon the determined degree of modification.

4. The computer program product of claim 1, wherein the instructions for modifying the one or more physical features of the avatar based, at least in part, upon the one or more user inputs further comprises:

generating the first version of the avatar based, at least in part, upon the first set of the one or more user inputs; and generating the second version of the avatar based, at least in part, upon the second set of the one or more user inputs.

5. The computer program product of claim 4, wherein the instructions for displaying the avatar, wherein the avatar reflects the modifications to the one or more modified physical features of the avatar further comprises:

displaying one or more of the first version of the avatar to the first set of users and the second version of the avatar to the second set of users.

6. A computing system comprising:

a processor;

a memory module coupled with the processor;

a first software module executable by the processor and the memory module, wherein the first software module is configured to define one or more physical features of an avatar related to a physical appearance of the avatar, wherein the one or more physical features related to the physical appearance of the avatar correspond to one or more personality attributes of a user;

a second software module executable by the processor and the memory module, wherein the second software module is configured to receive one or more user inputs associated with the one or more personality attributes of the user, including receiving a first set of the one or more user inputs from a first set of users and receiving a second set of the one or more user inputs from a second set of users, wherein receiving the first set of the one or more user inputs from the first set of users and receiving the second set of the one or more user inputs from the second set of users includes perceptions of the first set of users and second set of users of how accurately the avatar represents the user;

a third software module executable by the processor and the memory module, wherein the third software module is configured to modify the one or more physical features of the avatar based, at least in part, upon the one or more user inputs associated with the one or more personality attributes of the user;

a fourth software module executable by the processor and the memory module, wherein the fourth software module is configured to display the avatar, wherein the displayed avatar reflects the modifications to the one or more modified physical features of the avatar; and a fifth software module executable by the processor and the memory module, wherein the fifth software module is configured to automatically provide different versions of the avatar to different sets of users based, at least in part, upon the received one or more user inputs associated with the one or more personality attributes of the user, wherein a first version of the avatar is provided based upon, at least in part, the one or more user inputs received from the first set of users and a second version of the avatar is provided based upon, at least in part, the one or more user inputs received from the second set of users.

7. The computing system of claim 6, further including a sixth software module executable by the processor and the memory module, wherein the sixth software module is configured to receive one or more user ratings associated with the one or more user inputs.

8. The computing system of claim 7, wherein the third software module, configured to modify the one or more physical features of the avatar based, at least in part, upon the one or more user inputs, is further configured to:

determine a degree of modification to apply to the one or more physical features based, at least in part, upon the one or more user ratings associated with the one or more user inputs; and modify the one or more physical features based, at least in part, upon the determined degree of modification.

9. The computing system of claim 6, wherein the third software module, configured to modify the one or more physical features of the avatar based, at least in part, upon the one or more user inputs, is further configured to:

generate the first version of the avatar based, at least in part, upon the first set of the one or more user inputs; and generate the second version of the avatar based, at least in part, upon the second set of the one or more user inputs.

10. The computing system of claim 9, wherein the fourth software module, configured to display the avatar, wherein the displayed avatar reflects the modifications to the one or more modified physical features of the avatar, is further configured to:

display one or more of the first version of the avatar to the first set of users and the second version of the avatar to the second set of users.

11. A computer implemented method comprising:

defining, via, at least in part, a computing device, one or more physical features of an avatar related to a physical appearance of the avatar, wherein the one or more physical features related to the physical appearance of the avatar correspond to one or more personality attributes of a user;

receiving, via, at least in part, the computing device, one or more user inputs associated with the one or more personality attributes of the user, including receiving a first set of the one or more user inputs from a first set of users and receiving a second set of the one or more user inputs from a second set of users, wherein receiving the first set of the one or more user inputs from the first set of users and receiving the second set of the one or more user inputs from the second set of users includes perceptions of the first set of users and second set of users of how accurately the avatar represents the user;

modifying, via, at least in part, the computing device, the one or more physical features based, at least in part, upon the one or more user inputs associated with the one or more personality attributes of the user;

displaying, via, at least in part, the computing device, the avatar, wherein the displayed avatar reflects the modifications to the one or more modified physical features of the avatar; and automatically providing, via, at least in part, the computing device, different versions of the avatar to different sets of users based, at least in part, upon the received one or more user inputs associated with the one or more personality attributes of the user, wherein a first version of the avatar is provided based upon, at least in part, the one or more user inputs received from the first set of users and a second version of the avatar is provided based upon, at least in part, the one or more user inputs received from the second set of users.

12. The computer implemented method of claim 11, further including:

receiving one or more user ratings associated with the one or more user inputs.

13. The computer implemented method of claim 12, wherein the instructions for modifying the one or more physical features of the avatar based, at least in part, upon the one or more user inputs further comprises:

determining a degree of modification to apply to the one or more physical features based, at least in part, upon the one or more user ratings associated with the one or more user inputs; and modifying the one or more physical features based, at least in part, upon the determined degree of modification.

14. The computer implemented method of claim 11, wherein modifying the one or more physical features of the avatar based, at least in part, upon the one or more user inputs further comprises:

generating the first version of the avatar based, at least in part, upon the first set of the one or more user inputs; and generating the second version of the avatar based, at least in part, upon the second set of the one or more user inputs.

15. The computer implemented method of claim 14, wherein displaying the avatar, wherein the avatar reflects the modifications to the one or more modified physical features of the avatar further comprises:

displaying one or more of the first version of the avatar to the first set of users and the second version of the avatar to the second set of users.

16. The computer implemented method of claim 11, wherein one or more of the physical features related to the physical appearance of the avatar correspond one or more of the personality attributes of the user that are related to a health of the user.

17. The computer implemented method of claim 11, wherein one or more of the physical features related to the physical appearance of the avatar are related to at least one of: a nose and a mouth of the avatar.

18. The computer implemented method of claim 11, wherein one or more of the personality attributes of the user related to the personality of the user are related to at least one of: honesty, verbosity, and temperament of the user.

* * * * *